United States Patent
Ikeda et al.

(10) Patent No.: US 6,953,508 B2
(45) Date of Patent: Oct. 11, 2005

(54) HIGH STRENGTH STEEL WELD HAVING IMPROVED RESISTANCE TO COLD CRACKING AND A WELDING METHOD

(75) Inventors: Tomoaki Ikeda, Kashima (JP); Akio Yamamoto, Kashima (JP); Shigemichi Yamauchi, Kashima (JP); Nobuaki Takahashi, Kashima (JP); Masahiko Hamada, Kobe (JP)

(73) Assignee: Sumitomo Metal Industries, Ltd., Osaka (JP)

(*) Notice: Subject to any disclaimer, the term of this patent is extended or adjusted under 35 U.S.C. 154(b) by 176 days.

(21) Appl. No.: 10/334,717

(22) Filed: Jan. 2, 2003

(65) Prior Publication Data
US 2004/0129348 A1 Jul. 8, 2004

(51) Int. Cl.$^7$ ............ C22C 38/02; C22C 38/06; C22C 38/14
(52) U.S. Cl. ............ 148/320; 420/109; 420/104; 420/110; 219/137 WM; 219/121.14
(58) Field of Search ............... 420/109, 110, 420/104; 148/320; 219/137 WM; 428/683

(56) References Cited

U.S. PATENT DOCUMENTS 4,591,396 A    5/1986   Mazuda et al.

FOREIGN PATENT DOCUMENTS

| EP | 0753596 | 1/1997 |
|----|---------|--------|
| EP | 0867520 | 9/1998 |
| JP | 01197097 | 8/1989 |

OTHER PUBLICATIONS

Wenyue Z: "Prediction And Prevention Of Cold Cracking In Pipe–Line Steel Welding", China Welding, vol. 41, No. 2, Feb. 1995, pp. 25–33.

Maroef, I, et al.: "Hydrogen Trapping In Ferrite Steel Weld Metal", International Materials Reviews, ASM International, Materials Park, US, vol. 47, No. 4, 2002, pp. 210–211.

Prasad, S, et al.: "Significance Of Hydrogen Control In The Welding Of Low Alloy Steels", Indian Welding Journal, Indian Institute of Welding, Calcutta, IN, vol. 16, No. 3, Jul. 1984, pp. 87–93.

*Primary Examiner*—Deborah Yee
(74) *Attorney, Agent, or Firm*—Clark & Brody

(57) ABSTRACT

A welding method includes performing welding to form a weld metal consisting essentially of, in mass %,

| C: 0.01–0.15%, | Si: 0.02–0.6%, | Mn: 0.6–3.0%, |
|----------------|----------------|----------------|
| Al: 0.004–0.08%, | Ti: 0.003–0.03%, | B: at most 0.005%, |
| Cu: 0–1.2%, | Ni: 0–3%, | Cr: 0–1.2%, |
| Mo: 0–2%, | V: 0–0.05%, | Nb: 0–0.05%, | and a remainder of Fe and unavoidable impurities. The amounts of impurities are P: at most 0.03%, S: at most 0.03%, N: at most 0.01%, Ca or Mg: at most 0.005%. The value of Pcm expressed by the following Equation (3) is in the range of 0.23–0.35%, and the time T until the weld metal is cooled to 100° C. after welding satisfies the following Equation (1):

$$T(\text{seconds}) \geq \exp(7.0 \times Pw + 4.66) \quad \text{Equation (1)}$$

$$Pw = Pcm + HD/60 \quad \text{Equation (2)}$$

$$Pcm(\text{mass \%}) = C + Si/30 + Mn/20 + Cu/20 + Ni/60 + Cr/20 + Mo/15 + V/10 + 5B \quad \text{Equation (3)}$$

HD [ml/100 g]: amount of hydrogen in the weld metal immediately after welding.

16 Claims, 1 Drawing Sheet

HIGH STRENGTH STEEL WELD HAVING IMPROVED RESISTANCE TO COLD CRACKING AND A WELDING METHOD

BACKGROUND OF THE INVENTION

1. Technical Field

This invention relates to a high strength steel weld having a tensile strength (TS) of at least 750 MPa along with improved low temperature toughness and improved resistance to cold cracking, and a welding method capable of forming such a weld. A steel weld and a welding method according to the present invention are suitable for use in high strength steel structures such as welded steel pipes for pipelines and other uses, offshore structures, pressure vessels, tanks, and ship hulls.

2. Related Art

In a pipeline for transporting natural gas, crude oil, or similar material over long distances, if the operating pressure is increased, the transport efficiency of the pipeline is improved and transport costs are decreased. In order to increase the operating pressure, it is necessary to either increase the wall thickness of the pipe forming the pipeline or increase the strength of the material of which the pipe is formed. However, if the wall thickness of the pipe is increased, the efficiency of field (on-site) welding decreases, and it may become necessary to strengthen the foundation supporting the pipeline due to the increased weight of the pipe.

For this reason, there is an increasing need for higher strength welded steel pipe. In recent years, X80 grade welded steel pipe having a yield strength (YS) of at least 551 MPa and a tensile strength (TS) of at least 620 MPa has been standardized by the American Petroleum Institute (API) and has been put to actual use.

Furthermore, in recent years, high strength welded steel pipe superior to X80 grade is being developed based on the manufacturing technology for X80 grade welded steel pipe using a high strength steel having a tensile strength of 950 MPa or higher along with improved low temperature toughness and field weldability.

With such high strength welded steel pipe, it is important to not only guarantee the desired properties of the steel pipe base metal and the weld, but to also prevent cold cracking in the weld metal of the weld. In general, the strength of weld metal in a steel weld must be higher than the strength of the base metal. Accordingly, as the strength of a steel pipe base metal increases, it is necessary for the strength of a weld metal to also increase. Normally, the strength of a steel pipe base metal can be easily increased by adjusting the working conditions for hot rolling (by using controlled rolling and accelerated cooling). The strength of a weld metal is determined by its chemical composition and the cooling speed following welding. Thus, when the welding conditions are fixed (such as when the thickness of a steel plate being welded is fixed), the strength of the weld metal is thought to be nearly entirely determined by the amount of alloying elements.

Therefore, in order to increase the strength of a weld metal, it is necessary to include a large amount of alloying elements which are effective for increasing the strength of steel. However, if a weld metal contains a large amount of alloying elements, an increased amount of hydrogen is taken up into the weld metal during welding, thereby significantly increasing the susceptibility of the weld metal to cold cracking.

In order to improve the resistance to cold cracking of a weld metal, U.S. Pat. No. 6,188,037 proposes to reduce susceptibility to hydrogen cracking by increasing the amount of oxygen in a weld metal. However, due to the increased amount of oxygen in the weld metal, not only does the toughness of the weld metal decrease, but it also becomes easy for defects such as slag inclusions and pinholes to occur in the weld metal, leading to a decrease in weld quality.

Japanese Patent No. 2,555,400 proposes a consumable nozzle electroslag welding method in which a weld metal having a prescribed chemical composition is formed and it is cooled by accelerated cooling at a cooling rate of 0.3–5° C./sec to a temperature of 500° C. or below. In the examples of that patent, the temperature at the completion of cooling is in the range of 500–300° C. In that method, the welding techniques which can be employed are restricted, and hence it cannot be applied to steel pipe, for example. In addition, the subject of that patent is a low strength steel, and it does not disclose a method of preventing cold cracking in a high strength steel, which is the subject of the present invention.

SUMMARY OF THE INVENTION

The present invention provides a high strength steel weld having a high tensile strength of at least 750 MPa and improved low temperature toughness and resistance to cold cracking in, for example, a high strength steel pipe which is manufactured by the submerged arc welding method and which has a high tensile strength of at least 750 MPa. The present invention also provides a welding method which can form such a weld in a reliable manner.

According to one aspect, the present invention relates to a weld having a weld metal which is formed by welding a base metal steel (such as a steel plate forming a steel pipe) and which has a high strength, for example, a tensile strength (TS) of at least 750 MPa and excellent resistance to cold cracking. A steel weld according to the present invention has a weld metal consisting essentially of, in mass %,

| | | |
|---|---|---|
| C: 0.01–0.15%, | Si: 0.02–0.6%, | Mn: 0.6–3.0%, |
| Al: 0.004–0.08%, | Ti: 0.003–0.03%, | B: at most 0.005%, |
| Cu: 0–1.2%, | Ni: 0–3%, | Cr: 0–1.2%, |
| Mo: 0–2%, | V: 0–0.05%, | Nb: 0–0.05%, | and a remainder of Fe and unavoidable impurities, the amounts of impurities being P: at most 0.03%, S: at most 0.03%, N: at most 0.01%, Ca or Mg: at most 0.005%, and the value of Pcm (the weld crack susceptibility composition) of the weld metal given by the following Equation (3) (in which the symbol of each element appearing in the equation indicates the content of the element in mass %) being in the range of 0.23–0.35%. In addition, the time T until the weld metal is cooled to 100° C. after welding satisfies the following Equation (1):

$$T(\text{seconds}) \geq \exp(7.0 \times Pw + 4.66) \quad \text{Equation (1)}$$

wherein $$Pw = Pcm + HD/60 \quad \text{Equation (2)}$$

$$Pcm(\text{mass \%}) = C + Si/30 + Mn/20 + Cu/20 + Ni/60 + Cr/20 + Mo/15 + V/10 + 5B \quad \text{Equation (3)}$$

HD [ml/100 g]: amount of hydrogen in the weld metal immediately after welding.

According to another aspect, the present invention relates to a welded steel structure, such as a steel pipe (namely, a welded steel pipe), an offshore structure, a pressure vessel, a tank, or a ship hull having the above-described weld.

According to yet another aspect, the present invention relates to a welding method for steel which can form a steel weld having a weld metal with a high strength and an excellent resistance to cold cracking as described above. This welding method is characterized by forming a weld metal having the above-described chemical composition in which the value of Pcm (the weld crack susceptibility composition) expressed by the above Equation (3) is in the range of 0.23–0.35%. In addition, the method is also characterized in that the time T after welding until the weld metal is cooled to 100° C. satisfies the above Equation (1) (this condition being attainable using a means such as preheating before welding or post-heating or heat insulation after welding, for example).

Cu, Ni, Cr, Mo, V, and Nb are optional elements in the weld metal. One or more of these elements can be included in the weld metal in the above-described amounts for the purpose of increasing strength and/or toughness.

The term "weld" as used herein means a weld zone of steel which encompasses the weld metal and the heat affected zone (HAZ) surrounding the weld metal, which are formed by welding. The term "weld metal" means the portion of a weld which melts during welding and then solidifies.

The weld of the weld is formed from a molten welding rod or wire in which the metal components of a flux and of the base metal are dissolved. Accordingly, the above-described elements in the weld metal primarily come from the welding rod or wire, but part of them may be introduced from the base metal or the flux. In the present invention, it is sufficient for the chemical composition of the weld metal formed after welding to be in the above-described range and for the value of Pcm to satisfy the above-described Equation (3).

BRIEF DESCRIPTION OF THE DRAWING

The attached FIGURE is a graph showing the relationship between Pcm, which affects cold cracking, and the cooling time T.

DETAILED EXPLANATION OF THE INVENTION

Figure 1:
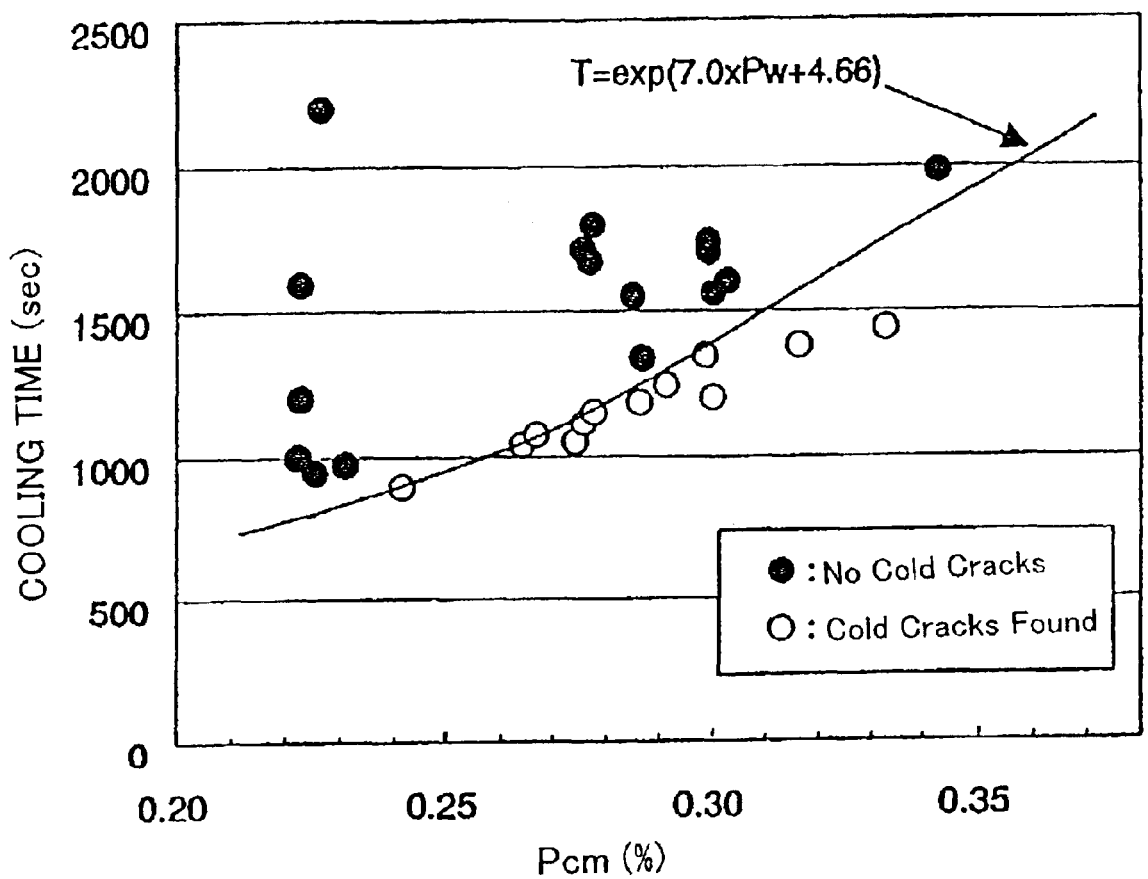

The present inventors found that by limiting the content of alloying elements in a weld metal to a suitable range and by adjusting the cooling time after welding so as to correlate with the chemical composition or the amount of hydrogen in the weld metal, a weld metal having a tensile strength of at least 750 MPa and excellent resistance to cold cracking can be formed in a stable manner by the submerged arc welding method.

Specifically, first, in order to obtain a suitably high strength for a weld metal, the content of each element in the weld metal is restricted as described below, and the value of Pcm (mass %) is in the range of from 0.23% to 0.35%. This is in order to achieve a balance of the desired strength and toughness for the weld metal without adversely affecting low temperature toughness. However, by this means alone, it is not possible to prevent cold cracking.

In order to prevent cold cracking, it is effective to lower the hydrogen content in a weld metal. The present inventors found that if the cooling time required to cool down a weld metal to 100° C. after welding is longer than a certain limit, it is possible to promote dehydrogenation of the weld metal sufficiently to prevent cold cracking. It is believed that since hydrogen can diffuse adequately in a temperature region of 100° C. or above, a prolonged length of time until a weld metal is cooled to 100° C. from the high temperature immediately after welding is important in order for dehydrogenation of the weld metal to promote sufficiently.

Cold cracking in a weld metal increase as the hydrogen content in the weld metal and the value of Pcm increase, and the cooling time required to prevent cold cracking is within the range expressed by Equation (1). Namely, if the amount of hydrogen HD [ml/100 g] in the weld metal and the value of Pcm increase, the cooling time T to cool a weld metal to 100° C. after welding should be increased, based on Equations (1) and (2).

Cooling time $T(\text{seconds}) \geq \exp(7.0 \times Pw + 4.66)$  Equation (1)

Weld crack susceptibility index $Pw = Pcm + HD/60$  Equation (2)

$Pcm(\text{mass \%}) = C + Si/30 + Mn/20 + Cu/20 + Ni/60 + Cr/20 + Mo/15 + V/10 + 5B$  Equation (3)

Next, the content of each element in the weld metal will be described. In the following explanation, % as used with respect to the chemical composition and Pcm means mass %.

C: 0.01–0.15%

In order to guarantee the strength of a weld metal, the carbon (C) content is at least 0.01%. However, excessive C leads to an increase in the amount of precipitated carbides and coarsening of the carbides, thereby deteriorating the toughness of the weld metal. For this reason, the upper limit on the C content is 0.15%. In order to further improve toughness, the C content is preferably at most 0.1% and more preferably at most 0.08%.

Si: 0.02–0.6%

Silicon (Si) increases the strength of a weld metal and has a deoxidizing effect. In order to obtain these effects, the amount of Si in the weld metal is at least 0.02%. However, addition of too much Si causes a decrease in the toughness of the weld metal and produces a deterioration in resistance to crack susceptibility, and the upper limit on the amount of Si is 0.6%. Preferably the Si content is 0.1–0.2%.

Mn: 0.6–3.0%

Manganese (Mn) also increases the strength of a weld metal and has a deoxidizing effect. In order to obtain these effects, the lower limit on the Mn content is 0.6%. However, if the Mn content exceeds 3.0%, it causes a decrease in the toughness of the weld metal and deteriorates the resistance to crack susceptibility, and hence the upper limit on the Mn content is 3.0%. In order to further improve toughness and resistance to cracks, the Mn content is at most 2.5% and preferably at most 1.7%.

Al: 0.004–0.08%

Aluminum (Al) is important as a deoxidizer. In order for Al to exhibit a deoxidizing effect, the lower limit on the Al content is 0.004%. On the other hand, an excessive amount of Al causes the formation of coarse inclusions, and therefore the upper limit on the Al content is 0.08%. The Al content is preferably 0.01–0.04%.

Ti: 0.003–0.03%

Titanium (Ti) is important as a deoxidizer, and it also serves to prevent a minute amount of B from bonding with N, thereby assuring the hardenability attained by B, which is effective for increasing the strength of a weld metal. In order to obtain these effects, the lower limit on the Ti content is 0.003%. An excessive amount of Ti causes precipitation of TiC, which results in a significant deterioration in the toughness of the weld metal. For this reason, the upper limit on the Ti content is 0.03%. The Ti content is preferably 0.01–0.02%.

B: at most 0.005%

In very small amounts, boron (B) markedly increases hardenability of a weld metal and contributes to an increase in the strength thereof. Therefore, B is preferably included in an amount of at least 0.002%. However, addition of B in an excessive amount leads to a deterioration in resistance to cold cracking, and hence the upper limit on the B content is 0.005%. In order to assure an even better resistance to weld cracks, the B content is preferably at most 0.004% and more preferably at most 0.003%.

Cu: 0–1.2%

Copper (Cu) need not be contained in a weld metal, but Cu contributes to an increase in strength by the precipitation effect, so it may be added when a higher strength is desired. However, if the Cu content exceeds 1.2%, weld cracks can easily occur. Thus, when Cu is added, the Cu content is at most 1.2%. In order to further improve resistance to cold cracking, the Cu content is at most 0.8% and preferably at most 0.6%.

Ni: 0–3%

Nickel (Ni) need not be contained in a weld metal, but Ni has a large effect on increasing toughness, so it may be added when a higher toughness is desired. However, if the Ni content exceeds 3%, the molten metal formed by welding tends to have poor flowability and thereby form weld defects. Therefore, when Ni is added, the Ni content is at most 3% and preferably at most 2.5%.

Cr: 0–1.2%

Chromium (Cr) need not be contained in a weld metal, but Cr is effective for increasing hardenability, so it may be included when a higher strength is desired for the weld metal. However, if the Cr content exceeds 1.2%, it tends to cause cold cracking. Thus, when it is added, the Cr content is at most 1.2%. Preferably the Cr content is at most 1.0%.

Mo: 0–2%

Molybdenum (Mo) need not be contained in a weld metal, but Mo increases hardenability and produces precipitation hardening. Thus, since Mo is effective for increasing strength, it may be added when a higher strength weld metal is desired. However, if the Mo content exceeds 2%, it becomes easy for cold cracking to occur. Therefore, when Mo is added, its content is at most 2% and preferably at most 1%.

V: 0–0.05%

Vanadium (V) need not be contained in a weld metal, but V produces precipitation hardening and it is thus effective for increasing strength. Therefore, V may be added when a higher strength weld metal is desired. However, if the V content exceeds 0.05%, it becomes easy for cold cracking to occur, so when V is added, its content is at most 0.05% and preferably at most 0.03%.

Nb: 0–0.05%

Niobium (Nb) need not be contained in a weld metal, but Nb produces precipitation hardening and is effective for increasing strength, so it may be added when a higher strength weld metal is desired. However, if the Nb content exceeds 0.05%, it becomes easy for cold cracking to occur. Thus, when Nb is added, its content is at most 0.05% and preferably at most 0.03%.

Pcm: 0.23–0.35%

In order to ensure that a weld metal has a suitably high strength and toughness and to prevent cold cracking, in addition to restricting the content of each element in the weld metal within the above-described range, it is important to adjust the weld crack susceptibility composition Pcm (=C+Si/30+Mn/20+Cu/20+Ni/60+Cr/20+Mo/15+V/10+5B). If the value of Pcm is less than 0.23%, the strength of the weld metal becomes low. If it is greater than 0.35%, the toughness of the weld metal is not sufficient to prevent cold cracking. Thus, the value of Pcm is in the range of 0.23–0.35% and preferably in the range of 0.25–0.30%.

Impurity Elements

The amount of unavoidable impurities such as P, S, and N is preferably as small as possible, but the effects of the present invention are not significantly impaired if the content of these elements in the weld metal is P: at most 0.03%, S: at most 0.03%, N: at most 0.01%, and Ca or Mg: at most 0.005%. The content of impurity elements is preferably P: at most 0.01%, S: at most 0.01%, N: at most 0.006%, and Ca or Mg: at most 0.002%.

Cooling Time

In order to prevent cold cracking in a weld metal, it is insufficient to merely limit the content of each element in the weld metal and Pcm in the manner described above. In the present invention, the time T for cooling the weld metal to 100° C. after welding is adjusted so as to be in the range given by the following Equation (1).

$$T(\text{seconds}) \geq \exp(7.0 \times Pw + 4.66) \quad \text{Equation (1)}$$

$$Pw = Pcm + HD/60 \quad \text{Equation (2)}$$

$$Pcm(\text{mass \%}) = C + Si/30 + Mn/20 + Cu/20 + Ni/60 + Cr/20 + Mo/15 + V/10 + 5B \quad \text{Equation (3)}$$

In order to prevent cold cracking, it is necessary to reduce the amount of hydrogen in a weld metal which is a cause of the formation of cracks. As a measure to decrease the amount of hydrogen in a weld metal, it is conceivable to (a) increase the degree of dehydrogenation (amount of hydrogen removal) after welding, or (b) reduce the entry of hydrogen during welding. In the submerged arc welding method, the flux used for welding tends to absorb moisture and thus pick up hydrogen which enters a weld metal. Therefore, with the object of achieving measure (b), it is usual to use a desiccated flux to perform welding. However, there is a limit to the reduction in the amount of hydrogen by this method alone, and cold cracking cannot be completely prevented.

In the present invention, in order to achieve the above measure (a) or increase the degree of dehydrogenation after welding, the cooling time after welding is regulated. In the temperature region above 100° C., since hydrogen can diffuse at a high speed, it is possible to promote dehydrogenation adequately. In the present invention, by making sufficiently long the period of time over which the temperature of the weld metal lowers from the high temperature region immediately after welding to 100° C., sufficient dehydrogenation takes place after welding to prevent cold cracking.

Cold cracking occurs more easily as the amount of certain elements in the weld metal increases or as the value of Pcm increases, and as the amount of hydrogen (HD) in the weld metal increases. Accordingly, the more Pcm and/or HD increase, it is necessary to have a longer cooling time (T) in order to prevent the formation of cracks. The present inventors found that a proper cooling time T can be prescribed as a function of Pcm and HD and obtained the above-described Equation (1).

The cooling time (T) can be adjusted by preheating of the welding site prior to welding or by post-heating or heat insulation after welding, but as long as the cooling time prescribed by the above-described Equation (1) can be guaranteed, other means of adjusting the cooling time may be employed. If the cooling time of the weld material in a temperature region of 100° C. or above is shorter than the range given by Equation (1), the occurrence of cold cracking cannot be prevented, but if the cooling time is in the range of Equation (1), cold cracking can be prevented.

Thus, in accordance with the present invention, (a) by controlling the composition of the weld metal as described above, (b) by having a value of Pcm which is in the range of 0.23–0.35%, and (c) by prolonging the cooling time T of the weld metal to 100° C. after welding depending on the value of Pcm and the amount of hydrogen in the weld metal (HD), it is possible to form a steel weld having a weld metal with a tensile strength (TS) of at least 750 MPa and in some cases 1000 MPa or higher along with improved excellent low temperature toughness and without cold cracking. In addition, there is no occurrence of weld defects such as slag inclusions or pin holes as encountered in a conventional method in which the amount of oxygen in a weld metal is increased. It is also possible to prevent the occurrence of weld defects due to a deviation of the composition of the weld metal from the desired range caused by oxidation, thereby making it possible to form a weld of good quality in a stable manner.

The welding method of the present invention is suitable for use with the submerged arc method. When performing welding according to the present invention, the compositions of the welding wire or rod and the flux which are to be used are determined taking into consideration the composition of the steel to be welded and the welding conditions, so that the chemical composition and the value of Pcm of the weld metal of the weld which is formed by welding are within the above-described ranges. In addition, a welding test is carried out with these materials under various conditions to measure the amount of hydrogen in the weld metal immediately after welding, and the cooling time (T) up to 100° C. necessary to prevent cold cracking is determined. Thereafter, a suitable preheating and/or post-heating or heat insulation means to obtain the determined cooling time is adopted.

EXAMPLES

The following examples are included merely to illustrate the present invention by taking the case in which the present invention is applied to a welded steel pipe for a pipeline or similar structure.

Welded steel pipe having a wall thickness of from 12 mm to 24 mm [outer diameter: from 500 mm (20 inches) to 1500 mm (60 inches)] was manufactured using UOE steel pipe manufacturing equipment from steel strip having various chemical compositions obtained by continuous casting and hot rolling. Welding was carried out by the submerged arc welding (SAW) method using various fluxes and welding wires. The time for the weld metal to cool to 100° C. after welding was measured by measuring the temperature of the weld metal using a non-contacting type thermometer. The cooling time T was adjusted by preheating prior to welding or by heat insulating after preheating.

The amount of hydrogen in the weld metal immediately after welding (HD: ml/100 g) was measured by an experiment using the same flux as used for pipe manufacture in accordance with JIS Z3118. For the examples of the present invention, the results were all at most 4 ml/100 g. The amount of hydrogen in the weld metal somewhat varies according to the weld conditions, but if it is at most 4 ml/100 g, the susceptibility to cold cracking is low, and it is possible to prevent cold cracking by the present invention.

The chemical composition of the weld metal was analyzed in accordance with API 5L using a sample taken from the weld metal. The results of analysis are shown in Tables 1 and 2 along with the value of Pcm (weld crack susceptibility composition) calculated from the above-described Equation (3).

From the value of Pcm and value of the above-described HD (amount of hydrogen in the weld metal), a weld crack susceptibility index Pw was calculated from the above-described Equation (2). In addition, from the obtained value of Pw, the lower limit on the cooling time prescribed by Equation (1), i.e. the cooling time T calculated by T=exp (7.0×Pw+4.66) was calculated. This lower limit is shown in Table 1 as the necessary cooling time Ta along with the measured cooling time T to 100° C.

The tensile strength (TS) of the weld metal was measured in accordance with AWS.D.1.1 using a test bar having a diameter of 6 mm taken from the weld metal. The low temperature toughness of the weld metal [the Charpy impact absorption energy at −20° C. (Charpy vE-20)] was measured in accordance with API 5L. Weld defects such as cold cracking were evaluated by ultrasonic reflectscopic test (URT) of the weld 48 hours after welding. These results are also shown in Tables 1 and 2. In the tables, with respect to the results of cold cracking, ○ indicates that no cold cracks were found, and X indicates that cold cracking occurred.

TABLE 1

| No. | WT$^1$ (mm) | C | Si | Mn | P | S | Cu | Ni | Cr | Mo | V | Nb | Ti | B | Al | Ca or Mg | Pcm |
|---|---|---|---|---|---|---|---|---|---|---|---|---|---|---|---|---|---|
| 1 | 15 | 0.08 | 0.05 | 1.21 | 0.007 | 0.001 | 0 | 0.8 | 0.5 | 0.4 | 0 | 0.01 | 0.012 | 0.003 | 0.011 | 0 | 0.222 |
| 2 | 18 | 0.06 | 0.18 | 1.48 | 0.006 | 0.001 | 0.2 | 1.6 | 0 | 0.6 | 0.04 | 0.03 | 0.015 | 0.001 | 0.009 | 0 | 0.226 |
| 3 | 12 | 0.05 | 0.16 | 1.12 | 0.006 | 0.001 | 0.8 | 2 | 0.7 | 0 | 0 | 0 | 0.012 | 0.0006 | 0.008 | 0 | 0.223 |
| 4 | 14 | 0.06 | 0.11 | 1.24 | 0.011 | 0.002 | 0.8 | 1.5 | 0 | 0.4 | 0 | 0 | 0.007 | 0.0011 | 0.012 | 0 | 0.223 |
| 5 | 16 | 0.11 | 0.11 | 0.87 | 0.011 | 0.002 | 0 | 0.8 | 0 | 0.7 | 0.04 | 0 | 0.007 | 0.0011 | 0.015 | 0 | 0.227 |
| 6 | 13 | 0.07 | 0.19 | 1.28 | 0.006 | 0.002 | 0 | 1.7 | 0.6 | 0.6 | 0 | 0.01 | 0.01 | 0.0006 | 0.03 | 0 | 0.242 |
| 7 | 21 | 0.1 | 0.16 | 1.54 | 0.006 | 0.001 | 0 | 1 | 0 | 0.9 | 0 | 0 | 0.013 | 0.001 | 0.034 | 0 | 0.264 |
| 8 | 17 | 0.07 | 0.19 | 1.74 | 0.006 | 0.002 | 0.2 | 1.5 | 0.6 | 0.6 | 0.03 | 0.03 | 0.01 | 0.0005 | 0.023 | 0 | 0.274 |
| 9 | 15 | 0.07 | 0.21 | 1.74 | 0.012 | 0.001 | 0.2 | 1.4 | 0.6 | 0.5 | 0.02 | 0.03 | 0.007 | 0.0008 | 0.034 | 0 | 0.267 |
| 10 | 14 | 0.07 | 0.21 | 1.75 | 0.011 | 0.002 | 0.2 | 1.5 | 0.6 | 0.6 | 0.03 | 0.03 | 0.011 | 0.0007 | 0.011 | 0 | 0.276 |
| 11 | 17 | 0.08 | 0.18 | 1.37 | 0.005 | 0.001 | 0.2 | 2.3 | 0.7 | 0.5 | 0.03 | 0.02 | 0.013 | 0.0007 | 0.01 | 0 | 0.278 |
| 12 | 22 | 0.09 | 0.18 | 1.64 | 0.007 | 0.001 | 0 | 1.4 | 0.7 | 0.6 | 0.06 | 0.05 | 0.018 | 0.0008 | 0.01 | 0 | 0.286 |
| 13 | 18 | 0.07 | 0.2 | 1.7 | 0.005 | 0.002 | 0.2 | 2.7 | 0.6 | 0.6 | 0.02 | 0.01 | 0.009 | 0.0005 | 0.022 | 0 | 0.291 |
| 14 | 20 | 0.09 | 0.16 | 1.46 | 0.007 | 0.001 | 0.4 | 2 | 0.6 | 0.6 | 0.04 | 0.03 | 0.013 | 0.0006 | 0.009 | 0 | 0.299 |
| 15 | 15 | 0.08 | 0.18 | 1.71 | 0.004 | 0.002 | 0.2 | 2.3 | 0.7 | 0.6 | 0.02 | 0.01 | 0.01 | 0.0006 | 0.024 | 0 | 0.300 |
| 16 | 18 | 0.1 | 0.15 | 1.56 | 0.008 | 0.001 | 0.2 | 2.2 | 0.7 | 0.7 | 0.02 | 0.01 | 0.014 | 0.0006 | 0.014 | 0 | 0.316 |
| 17 | 19 | 0.14 | 0.15 | 2.51 | 0.012 | 0.013 | 1.1 | 0 | 0 | 0 | 0 | 0 | 0.013 | 0.0015 | 0.024 | 0 | 0.333 |

TABLE 1-continued

| | | | | | | | | | | | | | | | | | | |
|---|---|---|---|---|---|---|---|---|---|---|---|---|---|---|---|---|---|---|
| 18 | 19 | 0.16 | 0.2 | 1.7 | 0.006 | 0.002 | 0 | 1.4 | 0.7 | 0.4 | 0.02 | 0.02 | 0.01 | 0.0004 | 0.028 | 0 | 0.341 |
| 19 | 16 | 0.009 | 0.2 | 2.1 | 0.006 | 0.002 | 0.5 | 1 | 0.6 | 0.4 | 0.02 | 0.01 | 0.01 | 0.0006 | 0.021 | 0 | 0.224 |
| 20 | 20 | 0.12 | 0.7 | 1.64 | 0.008 | 0.001 | 0 | 2 | 0 | 0 | 0 | 0 | 0.013 | 0.0009 | 0.01 | 0 | 0.263 |
| 21 | 16 | 0.07 | 0.01 | 1.06 | 0.005 | 0.002 | 0.2 | 2 | 0.6 | 0.6 | 0.02 | 0.01 | 0.01 | 0.0006 | 0.025 | 0 | 0.242 |
| 22 | 21 | 0.07 | 0.2 | 3.1 | 0.006 | 0.002 | 0.2 | 1.5 | 0.6 | 0.3 | 0.03 | 0.03 | 0.009 | 0.0005 | 0.021 | 0 | 0.322 |
| 23 | 12 | 0.07 | 0.19 | 0.5 | 0.006 | 0.002 | 0.2 | 1.7 | 0.6 | 0.5 | 0.02 | 0.02 | 0.01 | 0.0006 | 0.027 | 0 | 0.208 |

| No. | TS (MPa) | Charpy vE-20 (J) | Cooling Time[2] T | Cooling Time[2] Ta | Cold Cracking[3] | |
|---|---|---|---|---|---|---|
| 1 | 732 | 170 | 1000 | 798 | o | COMPARATIVE |
| 2 | 730 | 161 | 950 | 818 | o | |
| 3 | 748 | 155 | 1200 | 801 | o | |
| 4 | 741 | 164 | 1590 | 802 | o | |
| 5 | 745 | 154 | 2200 | 823 | o | |
| 6 | 857 | 202 | 900 | 914 | x | |
| 7 | 920 | 161 | 1040 | 1069 | x | |
| 8 | 923 | 183 | 1050 | 1145 | x | |
| 9 | 937 | 124 | 1080 | 1089 | x | |
| 10 | 867 | 221 | 1120 | 1163 | x | |
| 11 | 881 | 148 | 1150 | 1177 | x | |
| 12 | 860 | 165 | 1190 | 1250 | x | |
| 13 | 998 | 140 | 1250 | 1293 | x | |
| 14 | 884 | 136 | 1350 | 1363 | x | |
| 15 | 1050 | 111 | 1200 | 1374 | x | |
| 16 | 937 | 110 | 1380 | 1542 | x | |
| 17 | 1100 | 131 | 1440 | 1733 | x | |
| 18 | 993 | 72 | 2100 | 1829 | x | |
| 19 | 733 | 200 | 1010 | 808 | o | |
| 20 | 872 | 60 | 1650 | 1063 | o | |
| 21 | 881 | 190 | 2300 | 914 | flaw | |
| 22 | 963 | 95 | 1440 | 1607 | x | |
| 23 | 725 | 193 | 1300 | 722 | o | |

[1]WT = Wall Thickness;
[2]Cooling Time in second,
T: Measured Time,
Ta: Required Time;
[3]Cold Cracking:
o = Not Found,
x = Found

TABLE 2

| No. | WT[1] (mm) | Chemical Composition of Weld Metal (mass %) | | | | | | | | | | | | | | |
|---|---|---|---|---|---|---|---|---|---|---|---|---|---|---|---|---|
| | | C | Si | Mn | P | S | Cu | Ni | Cr | Mo | V | Nb | Ti | B | Al | Ca or Mg | Pcm |
| 24 | 20 | 0.08 | 0.19 | 1.84 | 0.007 | 0.001 | 1.3 | 0 | 0 | 0 | 0 | 0 | 0.018 | 0.0007 | 0.009 | 0 | 0.247 |
| 25 | 21 | 0.11 | 0.21 | 1.81 | 0.007 | 0.001 | 0 | 3.1 | 1 | 0 | 0 | 0 | 0.018 | 0.0007 | 0.031 | 0 | 0.313 |
| 26 | 17 | 0.09 | 0.23 | 1.77 | 0.008 | 0.001 | 0 | 0 | 1.3 | 0 | 0 | 0 | 0.009 | 0.0007 | 0.044 | 0 | 0.255 |
| 27 | 24 | 0.12 | 0.18 | 2.1 | 0.004 | 0.002 | 0 | 0 | 0 | 2.2 | 0 | 0 | 0.01 | 0.0009 | 0.018 | 0 | 0.382 |
| 28 | 19 | 0.12 | 0.24 | 1.99 | 0.011 | 0.015 | 0 | 0 | 0 | 0 | 0.07 | 0 | 0.005 | 0.0003 | 0.011 | 0 | 0.236 |
| 29 | 19 | 0.09 | 0.19 | 2.2 | 0.004 | 0.002 | 0 | 2 | 0 | 0 | 0 | 0.06 | 0.011 | 0.0006 | 0.021 | 0 | 0.243 |
| 30 | 18 | 0.08 | 0.16 | 1.07 | 0.008 | 0.001 | 0.2 | 2.1 | 0.8 | 0.7 | 0.02 | 0.01 | 0.04 | 0.0008 | 0.011 | 0 | 0.277 |
| 31 | 14 | 0.07 | 0.18 | 1.74 | 0.011 | 0.003 | 0.2 | 1.5 | 0.6 | 0.6 | 0.03 | 0.03 | 0.002 | 0.0004 | 0.018 | 0 | 0.273 |
| 32 | 23 | 0.08 | 0.16 | 1.04 | 0.007 | 0.001 | 0.2 | 2.6 | 0.7 | 0.6 | 0.02 | 0.01 | 0.013 | 0.006 | 0.011 | 0 | 0.298 |
| 33 | 14 | 0.07 | 0.23 | 1.77 | 0.012 | 0.001 | 0 | 0 | 0 | 0.6 | 0.03 | 0.02 | 0.015 | 0.001 | 0.029 | 0 | 0.214 |
| 34 | 23 | 0.09 | 0.19 | 1.26 | 0.004 | 0.002 | 0 | 2 | 0.7 | 0.6 | 0.02 | 0.01 | 0.011 | 0.0009 | 0.09 | 0 | 0.274 |
| 35 | 18 | 0.08 | 0.19 | 1.44 | 0.004 | 0.002 | 0.2 | 2 | 0.6 | 0.6 | 0.02 | 0.01 | 0.01 | 0.001 | 0.003 | 0 | 0.279 |
| 36 | 16 | 0.10 | 0.19 | 1.65 | 0.008 | 0.001 | 0 | 0 | 0.5 | 0.2 | 0.01 | 0.01 | 0.01 | 0.0006 | 0.008 | 0 | 0.231 |
| 37 | 16 | 0.06 | 0.17 | 1.17 | 0.008 | 0.001 | 0.9 | 2 | 0.7 | 0.5 | 0.02 | 0.01 | 0.012 | 0.0008 | 0.009 | Ca:0.002 | 0.277 |
| 38 | 18 | 0.07 | 0.19 | 1.76 | 0.006 | 0.002 | 0.2 | 1.9 | 0.5 | 0.6 | 0.02 | 0.01 | 0.01 | 0.0005 | 0.024 | Mg:0.005 | 0.276 |
| 39 | 15 | 0.07 | 0.21 | 1.75 | 0.007 | 0.002 | 0.2 | 1.7 | 0.6 | 0.6 | 0.02 | 0.01 | 0.01 | 0.0005 | 0.031 | 0 | 0.277 |
| 40 | 21 | 0.08 | 0.18 | 1.61 | 0.007 | 0.001 | 0.2 | 1.7 | 0.8 | 0.5 | 0.03 | 0.03 | 0.018 | 0.0008 | 0.007 | 0 | 0.285 |
| 41 | 17 | 0.06 | 0.16 | 1.32 | 0.006 | 0.001 | 0.8 | 2.1 | 0.7 | 0.6 | 0.02 | 0.01 | 0.012 | 0.0007 | 0.008 | Mg:0.003 | 0.287 |
| 42 | 19 | 0.08 | 0.18 | 1.17 | 0.007 | 0.001 | 0.9 | 2 | 0.8 | 0.5 | 0.02 | 0.01 | 0.012 | 0.0009 | 0.013 | 0 | 0.303 |
| 43 | 17 | 0.13 | 0.4 | 2.4 | 0.006 | 0.001 | 0 | 2 | 0 | 0 | 0 | 0 | 0.014 | 0.0007 | 0.024 | Ca:0.004 | 0.300 |
| 44 | 22 | 0.08 | 0.21 | 1.74 | 0.004 | 0.002 | 0.2 | 2.4 | 0.6 | 0.6 | 0.02 | 0.01 | 0.011 | 0.0006 | 0.053 | 0 | 0.299 |
| 45 | 20 | 0.08 | 0.2 | 1.73 | 0.004 | 0.002 | 0.2 | 2.1 | 0.7 | 0.6 | 0.02 | 0.01 | 0.009 | 0.0008 | 0.034 | 0 | 0.299 |
| 46 | 24 | 0.10 | 0.3 | 2.2 | 0.003 | 0.003 | 0.4 | 2 | 0.6 | 0.5 | 0.02 | 0.01 | 0.009 | 0.0008 | 0.034 | 0 | 0.343 |

TABLE 2-continued

| No. | TS (MPa) | Charpy vE-20 (J) | Cooling Time[2] | | Cold Cracking[3] | |
| --- | --- | --- | --- | --- | --- | --- |
| | | | T | Ta | | |
| 24 | 800 | 162 | 1060 | 948 | H—C[4] | COMPARATIVE |
| 25 | 931 | 162 | 2400 | 1503 | flaw | |
| 26 | 938 | 58 | 2000 | 1002 | x | |
| 27 | 1150 | 61 | 1120 | 2445 | x | |
| 28 | 802 | 62 | 1550 | 879 | x | |
| 29 | 911 | 85 | 1400 | 921 | x | |
| 30 | 866 | 79 | 1450 | 1167 | o | |
| 31 | 911 | 92 | 1900 | 1139 | o | |
| 32 | 898 | 63 | 1380 | 1353 | x | |
| 33 | 743 | 174 | 1750 | 754 | o | |
| 34 | 962 | 119 | 1230 | 1148 | flaw | |
| 35 | 975 | 91 | 1500 | 1185 | o | |
| 36 | 761 | 198 | 975 | 850 | o | INVENTIVE |
| 37 | 865 | 158 | 1670 | 1170 | o | |
| 38 | 954 | 149 | 1710 | 1159 | o | |
| 39 | 925 | 189 | 1800 | 1174 | o | |
| 40 | 895 | 147 | 1550 | 1240 | o | |
| 41 | 863 | 144 | 1340 | 1255 | o | |
| 42 | 894 | 166 | 1600 | 1402 | o | |
| 43 | 1002 | 173 | 1560 | 1377 | o | |
| 44 | 1033 | 146 | 1740 | 1366 | o | |
| 45 | 1020 | 134 | 1700 | 1368 | o | |
| 46 | 1130 | 104 | 1980 | 1854 | o | |

[1]WT = Wall Thickness;
[2]Cooling Time in second,
T: Measured Time,
Ta: Required Time;
[3]Cold Cracking:
o = Not Found,
x = Found;
[4]H-C = hot cracking In order to obtain a weld having high strength and toughness and improved resistance to cold cracking, desired target mechanical properties of the weld are a tensile strength (TS) of at least 750 MPa and a Charpy impact value vE-20 of at least 100 J.

In the tables, for Nos. 1–5, Pcm was less than the lower limit (0.23) according to the present invention, and the strength of the weld metal was less than the target value of 750 MPa.

Nos. 6–17 had a cooling time T from after welding until 100° C. which was shorter than the necessary cooling time Ta, and cold cracking occurred.

Even if the cooling time is sufficiently long, if the composition of a weld metal is not suitable, the performance of the weld metal cannot be guaranteed. The C content was too low for No. 19, the Mn content was too low for No. 23, and the B content was too low for No. 33, so Pcm was smaller than the lower limit, and the tensile strength of the weld metal became low.

On the other hand, the C content for No. 18, the Mn content for No. 22, the Cr content for No. 26, the Mo content for No. 27, the V content for No. 28, the Nb content for No. 29, and the B content for No. 32 were too high, so the low temperature toughness (the Charpy impact value) and the resistance to cold cracking of the weld metal deteriorated.

No. 20 contained too much Si, No. 30 contained too much Ti, No. 31 contained too little Ti, and No. 35 contained too little Al, so the low temperature toughness of the weld metal decreased.

For No. 21, Si was too small, and defects occurred due to insufficient deoxidation. No. 24 contained too much Cu, and hot cracking occurred. No. 25 contained too much Ni, and defects occurred due to the formation of beads having uneven shapes. No. 34 contained too much Al, and defects occurred due to slag inclusions, thereby causing problems in weld quality.

In contrast, in Nos. 36–46 according to the present invention, (a) the composition of the weld metal was suitable, (b) Pcm was in the range of 0.23–0.35%, and (c) the cooling time T from after welding to cool to 100° C. was longer than the necessary cooling time Ta. As a result, it was possible to form a weld having a weld metal with a high tensile strength (TS≧750 MPa) and a high low temperature toughness (a Charpy impact value vE-20≧100 J) and with no cold cracks at all.

As can be seen from Table 2, according to the present invention, by adjusting the chemical composition of the weld metal, the tensile strength thereof can be made to exceed 1100 MPa, so the weld metal is suitable for welding of steel pipe having a very high tensile strength of 950 MPa or higher.

The attached FIGURE shows the presence or absence of cold cracking as functions of the value of Pcm and the cooling time T for Nos. 1–17 and 36–46. It can be seen from this FIGURE that cold cracking can be prevented by making the cooling time $$T \geq \exp(7.0 \times Pw + 4.66).$$

In a conventional method of increasing the oxygen content in a weld metal (described in U.S. Pat. No. 6,188,037), since the oxygen content in the weld metal becomes high, not only is the toughness of the weld decreased, but it becomes easy for defects such as slag inclusions and pin holes to occur in the weld metal. In contrast, in the present invention, such defects do not occur since cold cracking is prevented by prolonging the cooling time. In addition, there is no occurrence of defects due to an excess amount or shortage of elements in the weld metal as found in Nos. 21, 24, 25, and 34, and a deterioration in weld quality can be prevented.

In the above description, an example in which the present invention is applied to a welded steel pipe was described, but the present invention can of course also be applied to a weld of other high strength steel structures such as offshore structures, pressure vessels, tanks, and ship hulls.

What is claimed is:

1. A weld formed by welding of steel and having a weld metal, the weld metal consisting essentially of, in mass %,

| | | |
|---|---|---|
| C: 0.01–0.15%, | Si: 0.02–0.6%, | Mn: 0.6–3.0%, |
| Al: 0.004–0.08% | Ti: 0.003–0.03%, | B: at most 0.005% |
| Cu: 0–1.2% | Ni: 0–3%, | Cr: 0–1.2% |
| Mo: 0–2% | V: 0–0.05%, | Nb: 0–0.05% | and a remainder of Fe and unavoidable impurities, the amounts of the impurities being P: at most 0.03%, S: at most 0.03%, N: at most 0.01%, Ca or Mg: at most 0.005%, and the value of Pcm of the weld metal expressed by the following Equation (3) (in which the symbol of each element appearing in the equation indicates the content of the element in mass %) being in the range of from 0.23% to 0.35%, and the time T to cool the weld metal to 100° C. after welding satisfying the following Equation (1):

$$T(\text{seconds}) \geq \exp(7.0 \times Pw + 4.66) \qquad \text{Equation (1)}$$

where $$Pw = Pcm + HD60 \qquad \text{Equation (2)}$$

$$Pcm(\text{mass \%}) = C + Si/30 + Mn/20 + Cu/20 + Ni/60 + Cr/20 + Mo/15 + V/10 + 5B \qquad \text{Equation (3)}$$

HD [ml/100 g]: amount of hydrogen in the weld metal immediately after welding.

2. A weld as set forth in claim 1, wherein the weld metal contains at least one of:

| | | |
|---|---|---|
| Cu: at most 1.2% | Ni: at most 3%, | Cr: at most 1.2% |
| Mo: at most 2% | V: at most 0.05%, | Nb: at most 0.05%. |

3. A weld as set forth in claim 1 wherein the weld metal contains B: 0.0002–0.0005%.

4. A welded steel structure having a weld as set forth in claim 1.

5. A welded steel structure as set forth in claim 4 wherein the welded steel structure is selected from a steel pipe, an offshore structure, a pressure vessel, a tank, and a ship hull.

6. A welding method for steel, characterized by welding is performed to form a weld metal, the weld metal consisting essentially of, in mass %,

| | | |
|---|---|---|
| C: 0.01–0.15% | Si: 0.02–0.6%, | Mn: 0.6–3.0% |
| Al: 0.004–0.08% | Ti: 0.003–0.03%, | B: at most 0.005% |
| Cu: 0–1.2% | Ni: 0–3%, | Cr: 0–1.2% |
| Mo: 0–2% | V: 0–0.05% | Nb: 0–0.05% | and a remainder of Fe and unavoidable impurities, the amounts of the impurities being P: at most 0.03%, S: at most 0.03%, N: at most 0.01%, Ca or Mg: at most 0.005%, and the value of Pcm of the weld metal expressed by the following Equation (3) (in which the symbol of each element appearing in the equation indicates the content of the element in mass %) being in the range of from 0.23% to 0.35%, and the time T to cool the weld metal to 100° C. after welding satisfying the following Equation (1):

$$T(\text{seconds}) \geq \exp(7.0 \times Pw + 4.66) \qquad \text{Equation (1)}$$

where $$Pw = Pcm + HD60 \qquad \text{Equation (2)}$$

$$Pcm(\text{mass \%}) = C + Si/30 + Mn/20 + Cu/20 + Ni/60 + Cr/20 + Mo/15 + V/10 + 5B \qquad \text{Equation (3)}$$

HD [ml/100 g]: amount of hydrogen in the weld metal immediately after welding.

7. A welding method as set forth in claim 6, wherein the weld metal includes at least one of

| | | |
|---|---|---|
| Cu: at most 1.2% | Ni: at most 3%, | Cr: at most 1.2% |
| Mo: at most 2% | V: at most 0.05%, and | Nb: at most 0.05%. |

8. A welding method as set forth in claim 6 wherein the B content of the weld metal is B: 0.0002–0.005%.

9. A welding method as set forth in claim 6 wherein the welding is performed by the submerged arc method.

10. A welded steel structure having a weld as set forth in claim 2.

11. A welded steel structure having a weld as set forth in claim 3.

12. A welded steel structure having a weld as set forth in claim 4.

13. A weld as set forth in claim 2 wherein the weld metal contains B: 0.0002–0.005%.

14. A welding method as set forth in claim 7 wherein the B content of the weld metal is B: 0.0002–0.005%.

15. A welding method as set forth in claim 7 wherein the welding is performed by the submerged arc method.

16. A welding method as set forth in claim 8 wherein the welding is performed by the submerged arc method.

* * * * *

UNITED STATES PATENT AND TRADEMARK OFFICE
CERTIFICATE OF CORRECTION

PATENT NO. : 6,953,508 B2  Page 1 of 1
APPLICATION NO. : 10/334717
DATED : October 11, 2005
INVENTOR(S) : Tomoaki Ikeda et al.

It is certified that error appears in the above-identified patent and that said Letters Patent is hereby corrected as shown below:

On the title page, item [56]:
The following prior art references should be listed under References Cited, Foreign Patent Documents

JP    08-104922    4/1996
JP    08-209291    8/1996

Signed and Sealed this

Second Day of March, 2010

David J. Kappos
*Director of the United States Patent and Trademark Office*